US006981355B2

(12) United States Patent
McClure et al.

(10) Patent No.: US 6,981,355 B2
(45) Date of Patent: Jan. 3, 2006

(54) METHOD AND APPARATUS FOR PREVENTING STRETCH FILM FROM ADHERING TO PARTS OF A ROUND BALE WRAPPING MECHANISM

(75) Inventors: John R. McClure, New Holland, PA (US); Imants Ekis, Leola, PA (US); Stephen C. Schlotterbeck, Leola, PA (US); John D. Fornadel, York, PA (US)

(73) Assignee: CNH America LLC, New Holland, PA (US)

( * ) Notice: Subject to any disclaimer, the term of this patent is extended or adjusted under 35 U.S.C. 154(b) by 21 days.

(21) Appl. No.: 10/806,978

(22) Filed: Mar. 23, 2004

(65) Prior Publication Data

US 2005/0210854 A1    Sep. 29, 2005

(51) Int. Cl.
*A01F 15/07* (2006.01)
*B65B 63/04* (2006.01)

(52) U.S. Cl. .......................... 53/399; 53/430; 53/441; 53/118; 53/556; 53/587

(58) Field of Classification Search .............. 53/399, 53/430, 441, 587, 556, 116–118, 389.1–389.4; 56/341, 343; 100/2, 3, 5, 13, 76, 87–89
See application file for complete search history.

(56) References Cited

U.S. PATENT DOCUMENTS

| | | | |
|---|---|---|---|
| 3,678,646 A * | 7/1972 | Clark | ........................... 53/587 |
| 4,332,125 A | 6/1982 | Holdren | |
| 4,409,784 A | 10/1983 | VanGinhoven | |
| 4,700,529 A * | 10/1987 | Bargholtz et al. | ............. 53/399 |
| 4,862,797 A * | 9/1989 | Mathis | ....................... 100/189 |
| 4,917,008 A | 4/1990 | van den Wildenberg | |
| 5,205,113 A | 4/1993 | Fassauer | |
| 5,326,320 A | 7/1994 | von Allwoerden | |
| 6,098,390 A | 8/2000 | Anstey | |
| 6,443,234 B1 | 9/2002 | Raymond | |
| 6,467,237 B2 | 10/2002 | Viaud | |
| 6,503,432 B1 * | 1/2003 | Barton et al. | .......... 264/173.16 |
| 6,550,218 B2 | 4/2003 | McClure et al. | |
| 6,565,706 B2 | 5/2003 | Moriuchi | |
| 6,692,835 B1 * | 2/2004 | Tomel, Jr. | .................... 428/463 |

OTHER PUBLICATIONS

RD 298056, Feb. 1989, RD.*

* cited by examiner

*Primary Examiner*—Stephen F. Gerrity
(74) *Attorney, Agent, or Firm*—John William Stader

(57) ABSTRACT

A method and apparatus for wrapping round bales with either netwrap or stretch film that prevent the stretch film from adhering to the parts of the wrapping mechanism.

5 Claims, 2 Drawing Sheets

METHOD AND APPARATUS FOR PREVENTING STRETCH FILM FROM ADHERING TO PARTS OF A ROUND BALE WRAPPING MECHANISM

BACKGROUND OF THE INVENTION

The present invention relates generally to an improved agricultural round baler, and particularly to improved method and apparatus for wrapping a round bale that prevents stretch film from sticking to the surfaces of the apparatus.

For several years agricultural round balers have been used to consolidate and package crop material so as to facilitate the storage and handling of the crop material for later use. Usually, a mower-conditioner cuts and conditions the crop material for windrow drying in the sun. When the cut crop material is properly dried, a baler, most likely a round baler, is pulled along the windrows to pick up the crop material and form it into cylindrically-shaped round bales. More specifically, the windrow pickup of the baler gathers the cut and windrowed crop material and lifts it into the baling chamber. The baling chamber consists of a pair of opposing sidewalls with a series of belts that rotate and compress the crop material into a cylindrical shape. When the bale has achieved a desired size and density, the operator wraps the bale to ensure that the bale maintains its shape and density. The operator then raises the tailgate of the baler and ejects the bale onto the ground. The tailgate is then closed and the cycle repeated as necessary and desired to manage the field of cut crop material.

The bale wrapping process initially comprised a plurality of wraps of baler twine; however, over the last several years a number of alternatives have been devised. Twine by itself does not wrap the edge of the bale adequately to maintain the shape and density, so one of the alternatives is to use a netting material that is dispensed from rolls with a length slightly longer than width of the round bale. The extra length wraps around the edge of the bale, better holding the package together. Alternatively, a silage wrap material—solid sheet of film, referred to herein as "stretch film", rather than an open net—is used when it is desired to produce a silage-type feed for livestock. The stretch film is provided in rolls usually slightly longer than the width of the bales being formed, and may or may not include an adhesive on one side (the side intended to be directed toward the bale). It has also been found that both the netwrap and stretch film materials hold and adhere better if they are stretched during the application process.

A troublesome problem presented with mechanisms that apply the stretch film to the bale arises because of its tendency to adhere to smooth surfaces. When the stretch film sticks to the metallic components of the dispensing mechanism, the stretch film has a strong tendency to rip or tear, resulting in miswraps and other material-feeding problems.

The concept of wrapping a round bale with netwrap material, such as shown, for example in U.S. Pat. No. 6,550,218, is not new. Nor is the idea of wrapping a round bale with a thin sheet of plastic material new, such as shown and discussed, for example, in U.S. Pat. No. 4,409,784. However, to date, there has been no commercially viable dispensing mechanism that can successfully handle both netwrap and film wrapping materials.

SUMMARY OF THE INVENTION

Accordingly, it is an object of the present invention is to provide a stretch film wrapping mechanism for a round baler that overcomes the problems identified above.

Another object of the present invention is to provide a stretch film wrapping mechanism for a round baler that is treated such that the stretch film does not adhere to the parts of the mechanism.

It is another object of the instant invention to provide a stretch film wrapping mechanism for a round baler that has the parts thereof coated with grit-type paint so that the stretch film does not adhere to the parts of the mechanism.

It is another object of the instant invention to provide a stretch film wrapping mechanism for a round baler that has the parts thereof coated with a polyester material so that the stretch film does not adhere to the parts of the mechanism.

It is another object of the instant invention to provide a stretch film wrapping mechanism for a round baler that has parts thereof treated to provide a roughened surface so that the stretch film does not adhere to those parts.

It is still another object of the instant invention to provide a wrapping mechanism for a round baler that can dispense both netwrap and stretch film, yet prevents the stretch film from adhering to the parts of the wrapping mechanism.

It is yet another object of this invention to provide an improved wrapping system for a round baler that is durable in construction, inexpensive of manufacture, carefree of maintenance, facile in assemblage, and simple, versatile and effective in use.

It is an even still further object of this invention to provide a method for wrapping a round baler with stretch film that prevents the stretch film from adhering to the parts of the wrapping mechanism.

These and other objects are attained by providing a method and apparatus for wrapping round bales with either netwrap or stretch film that prevent the stretch film from adhering to the parts of the wrapping mechanism.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
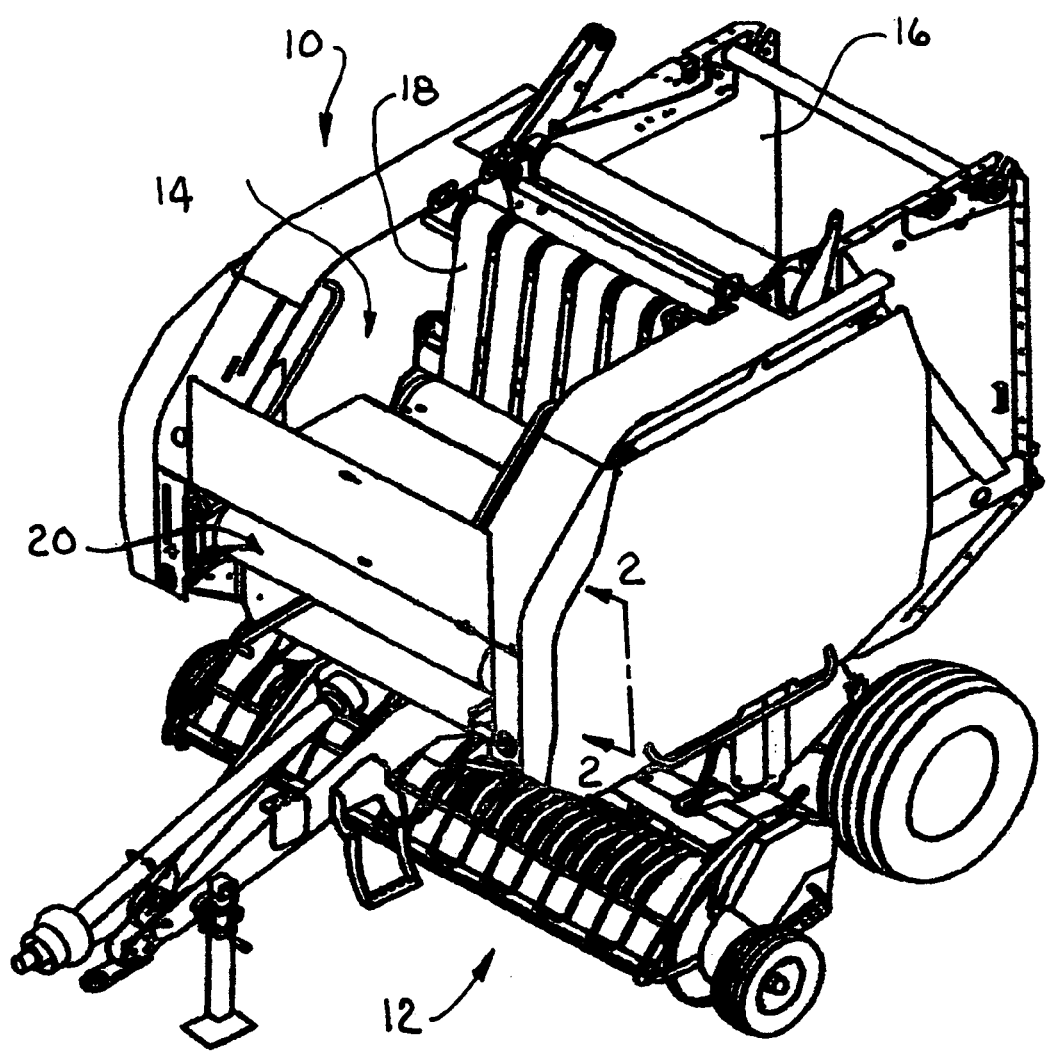
FIG. 1 is a front upper perspective view of a round baler of the type with which the invention may be used.

FIG. 1 shows a generalized agricultural round baler with which the present invention may be utilized. Essentially, the baling machine 10 is of the general type shown in quite a number of prior patents among which is U.S. Pat. No. 3,901,007, to Blanshine et al., entitled "Hay Roll Forming Machine" and dated Aug. 26, 1975. Normally, the baler is pulled through a field of property conditioned windrowed crop material behind a tractor, not shown. The crop material is moved from the field into the baler by pickup 12 and formed into a cylindrically-shaped round bale comprising successive layers of crop material. Baler 10 has a bale-forming chamber 14 and an upwardly pivotable clamshell 16 at the rear of the baler. The bale-forming chamber 14 includes a plurality of belts 18 that are driven along a path that causes the cut crop material to rotate or roll into the proper shape and density. When the bale reaches the proper size and density, it is wrapped, typically by twine or some other wrapping material, to maintain its shape, the clamshell is raised, and the bale ejected onto the ground. The clamshell is closed and the cycle repeated as necessary to package the crop in the field. The wrapping mechanism 20 is normally located at the forward end of the bale-forming chamber.

Figure 3:
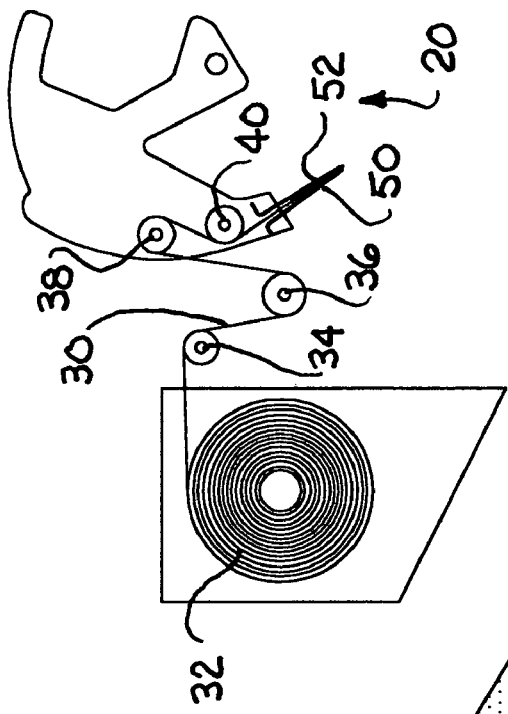
FIG. 3 is a schematic end view of the mechanism of FIG. 2.
Figure 2:
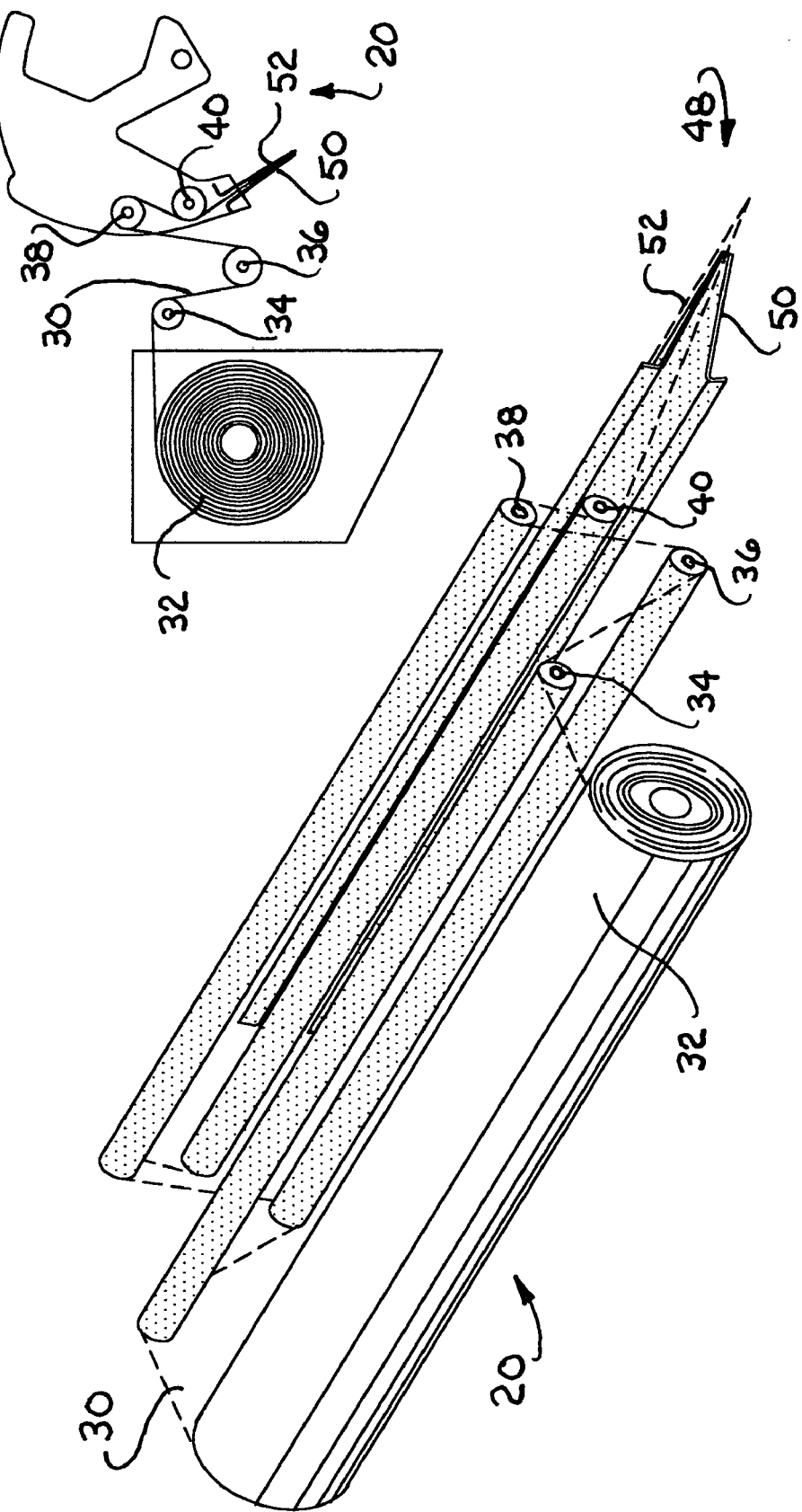
FIG. 2 is a partial perspective, partial schematic view, taken generally along lines 2—2 of FIG. 1 showing many of the components that make up the wrap dispensing mechanism.

Referring now to FIGS. 2 and 3, a portion of a mechanism for dispensing, 20, the stretch film 30 from a roll 32. This exemplar dispensing mechanism, except for the differences discussed below, includes four rollers 34–40 about which the stretch film sheet 30 is alternately wrapped before being fed between converging plates 50, 52 of the delivery assembly 48. Plates 50, 52 converge, but do not meet, so that there is a slot along the length thereof through which sheet 30 feeds on its way toward application to the bale. This particular structure is substantially as shown and disclosed in U.S. Pat. No. 6,550,218, which is incorporated herein by reference in its entirety. This dispensing mechanism, as discussed in the '218 patent, is excellent for handling netwrap materials; however, with the inclusion of the teachings of the present invention, this same structure can handle stretch film equally well.

Normally the parts and components of a dispensing mechanism are painted as any other element of the baler. However, FIG. 2 shows rollers 34–40 and delivery assembly 48 with a surface texture that is not smooth. It has been discovered that the stretch film will not adhere to a surface that has been sufficiently roughened. This roughening can be accomplished in a number of ways or through the application of a variety of materials. For example, the parts could be roughened by sand blasting, or with a grinder or an irregular treatment with strong acid or a pickling process. The parts could also be painted or dipped in a polyester that will "pucker" upon drying, or a liquid paint with a gritty material added, such as sand. The important concept to understand is that the stretch film will adhere to surfaces with sufficiently high wettability (i.e., the angle of contact), but will not adhere to surfaces with poor wettability. The roughening process reduces the wettabillity of the surface.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In an agricultural round baler having a multi-component dispensing mechanism for wrapping a bale with stretch film from a roll thereof, some of the components having surfaces that contact the stretch film during the wrapping process, the improvement comprising:
   each of the surfaces of the dispensing mechanism that contact the stretch film is roughened by a layer of paint containing a grit-like material to reduce the wettability of said surfaces to thereby prevent the stretch film from adhering to such surfaces.

2. The improvement of claim 1, wherein:
   the dispensing mechanism is alternatively capable of dispensing netwrap material from a roll thereof.

3. A round baler for forming crop material into cylindrical bales, said baler comprising:
   a wheel-supported main frame including opposing longitudinal sidewalls;
   a bale-forming chamber having a generally cylindrical shape with a transverse inlet and a crop-engaging mechanism disposed between said sidewalls;
   a crop feeding mechanism for feeding crop material into said chamber through said inlet whereupon said crop material is engaged by said crop-engaging mechanism under conditions where said crop engaging mechanism is moving along a portion of said periphery to engage said crop material and form it into a compacted cylindrical package as crop material accumulates in said chamber;
   a multi-component dispensing mechanism for wrapping the bale with a sheet-like material from a roll thereof, some of said components having surfaces that contact the sheet-like material during the wrapping process; and
   each of said surfaces of said dispensing mechanism that contact the sheet-like material to reduce the wettability of said surfaces is coated with paint containing a grit-like material to thereby prevent the sheet-like material from adhering to said surfaces.

4. The round baler of claim 3, wherein:
   said sheet-like material is selectively either netwrap or stretch film.

5. A method of preventing stretch film from adhering to the surfaces of an agricultural round baler wrapping mechanism comprising the steps of:
   providing an agricultural round baler having a multi-component dispensing mechanism for wrapping a bale with stretch film from a roll thereof, some of said components having surfaces that contact the stretch film during the wrapping process; and
   treating said surfaces by the addition of a layer of paint containing a grit-like material to reduce the wettability thereof sufficiently to prevent the stretch film from adhering to said surfaces.

* * * * *